(12) United States Patent
Clark

(10) Patent No.: US 9,707,491 B2
(45) Date of Patent: Jul. 18, 2017

(54) LIGHT ACTIVATED GLOW-IN-THE-DARK DOODLER

(71) Applicant: Randy Wayne Clark, Strathmore, CA (US)

(72) Inventor: Randy Wayne Clark, Strathmore, CA (US)

( * ) Notice: Subject to any disclaimer, the term of this patent is extended or adjusted under 35 U.S.C. 154(b) by 431 days.

(21) Appl. No.: 13/654,422

(22) Filed: Oct. 18, 2012

(65) Prior Publication Data

US 2013/0102222 A1    Apr. 25, 2013

Related U.S. Application Data

(60) Provisional application No. 61/549,197, filed on Oct. 19, 2011.

(51) Int. Cl.
*A63H 33/22* (2006.01)
*G06F 3/0354* (2013.01)

(52) U.S. Cl.
CPC ......... *A63H 33/22* (2013.01); *G06F 3/03542* (2013.01)

(58) Field of Classification Search
None
See application file for complete search history.

(56) References Cited

U.S. PATENT DOCUMENTS

| | | |
|---|---|---|
| 4,265,261 A | 5/1981 | Barker |
| 4,556,391 A | 12/1985 | Tardivel et al. |
| 4,590,381 A | 5/1986 | Mendelson |
| 4,612,948 A | 9/1986 | Simpson |
| 4,708,817 A | 11/1987 | Dudnick |
| 4,731,627 A | 3/1988 | Chisholm |
| 4,825,892 A | 5/1989 | Norman |

(Continued)

FOREIGN PATENT DOCUMENTS

| | | |
|---|---|---|
| WO | 9851980 | 11/1998 |
| WO | 2011018664 | 2/2011 |

OTHER PUBLICATIONS

Spectrum Scientifics' Store Blog, Review of Glow Crazy, Mar. 8, 2011, 5 pages <<https://spectrumscientifics.wordpress.com/2011/03/08/glow-crazy/>>.*

(Continued)

*Primary Examiner* — Jay Liddle
*Assistant Examiner* — Alex F. R. P. Rada, II
(74) *Attorney, Agent, or Firm* — Hackler Daghighian Martino & Novak

(57) ABSTRACT

A glow-in-the-dark toy kit includes a hand-held light emitting device having a power source, a control circuit, a narrow beam light emitting diode and a wide beam light emitting diode. The power source provides an electrical energy to the control circuit. The control circuit provides the electrical energy to either the narrow or wide beam light emitting diodes. The narrow and wide beam light emitting diodes emit a wavelength of light around 405 nanometers a distance of at least 10 feet. The range of the wavelength of light used could also be plus or minus 50 nanometers. A receiving device includes a phosphorescence layer that reemits light once illuminated with the wavelength of light from the emitting device. The hand-held light emitting device can then be used in a dark environment to react with the phosphorescence layer of the receiving device from the distance of at least 10 feet.

18 Claims, 10 Drawing Sheets

(56) References Cited

U.S. PATENT DOCUMENTS

| | | | |
|---|---|---|---|
| 5,019,849 A | 5/1991 | Harrison | |
| 5,021,931 A | 6/1991 | Matsui et al. | |
| 5,038,812 A | 8/1991 | Norman | |
| 5,270,100 A | 12/1993 | Giglio | |
| 5,307,253 A | 4/1994 | Jehn | |
| 5,411,046 A | 5/1995 | Wan | |
| 5,439,018 A | 8/1995 | Tsai | |
| 5,450,148 A | 9/1995 | Shu et al. | |
| 5,480,338 A | 1/1996 | Barthold | |
| 5,495,269 A | 2/1996 | Elrod et al. | |
| 5,512,002 A | 4/1996 | Lieberman | |
| 5,579,799 A | 12/1996 | Zheng | |
| 5,788,359 A | 8/1998 | Halsey et al. | |
| 5,938,308 A | 8/1999 | Feldman et al. | |
| 6,006,357 A | 12/1999 | Mead | |
| 6,022,126 A | 2/2000 | Sekine et al. | |
| 6,168,853 B1 | 1/2001 | Feng et al. | |
| 6,257,263 B1 | 7/2001 | Brereton | |
| 6,325,086 B1 | 12/2001 | Shinner et al. | |
| 6,371,144 B1 | 4/2002 | Ragatz | |
| 6,585,388 B2 | 7/2003 | Kim | |
| 6,666,742 B2 | 12/2003 | Koizumi | |
| 6,709,142 B2 | 3/2004 | Gyori | |
| 6,752,164 B1 | 6/2004 | Park | |
| 6,892,397 B2 | 5/2005 | Raz et al. | |
| 7,029,193 B1 | 4/2006 | Chao | |
| 7,152,248 B2 | 12/2006 | Ziemer | |
| 7,161,578 B1 | 1/2007 | Schneider | |
| 7,249,431 B1 | 7/2007 | Rose et al. | |
| 7,314,325 B2 | 1/2008 | Chang et al. | |
| 7,401,937 B2 * | 7/2008 | Abas | 362/103 |
| 7,445,550 B2 | 11/2008 | Barney et al. | |
| 7,481,234 B1 | 1/2009 | Gustafson et al. | |
| 7,500,917 B2 | 3/2009 | Barney et al. | |
| 7,503,677 B2 | 3/2009 | Morishita | |
| 7,793,673 B2 | 9/2010 | Anello | |
| 7,819,544 B2 | 10/2010 | Thompson et al. | |
| 7,871,175 B1 | 1/2011 | Bacca | |
| 7,878,905 B2 | 2/2011 | Weston et al. | |
| 8,100,540 B2 | 1/2012 | Huebner | |
| 8,245,321 B2 | 8/2012 | Ambrosio et al. | |
| 2005/0051203 A1 | 3/2005 | McCully et al. | |
| 2005/0195591 A1* | 9/2005 | Garcia et al. | 362/118 |
| 2006/0007059 A1* | 1/2006 | Bell | 345/55 |
| 2006/0150328 A1 | 7/2006 | Nguyen | |
| 2006/0250787 A1 | 11/2006 | Ho et al. | |
| 2007/0048065 A1 | 3/2007 | Schmidt et al. | |
| 2007/0060013 A1* | 3/2007 | Schmidt et al. | 446/175 |
| 2007/0128972 A1* | 6/2007 | Schmidt et al. | 446/219 |
| 2007/0256721 A1 | 11/2007 | Spain | |
| 2009/0040195 A1 | 2/2009 | Njolstad et al. | |
| 2009/0065039 A1* | 3/2009 | Livacich et al. | 135/123 |
| 2010/0067232 A1 | 3/2010 | Luo | |
| 2010/0146833 A1* | 6/2010 | Harris | 40/606.01 |
| 2010/0288321 A1 | 11/2010 | Dwyer | |
| 2011/0062868 A1* | 3/2011 | Domagala et al. | 315/32 |
| 2011/0081191 A1 | 4/2011 | Monzo et al. | |
| 2011/0169778 A1* | 7/2011 | Nungester | G06F 3/03542 345/175 |

OTHER PUBLICATIONS

Mighty Ape.co.nz online store—Glow Crazy Light Wand sold/released Sep. 27, 2010, pp. 1-5. <<https://www.mightyape.co.nz/product/glow-crazy-light-wand/8573099>>.*

Mommy Kat and Kids, Glow Crazy Distance Doodler Kit, Dec. 3, 2010, pp. 1-7. <<http://www.mommykatandkids.com/2010/12/glow-crazy-distance-doodler-kit-review.html>>.*

"Glow Crazy ! The Awesome new way to make fun go, go Glow !" published by YouTube on or before Sep. 21, 2010, available at, and printed from, URL<https://www.youtube.com/watch?v=vdmgSl7opd0>, 7 pages.*

* cited by examiner

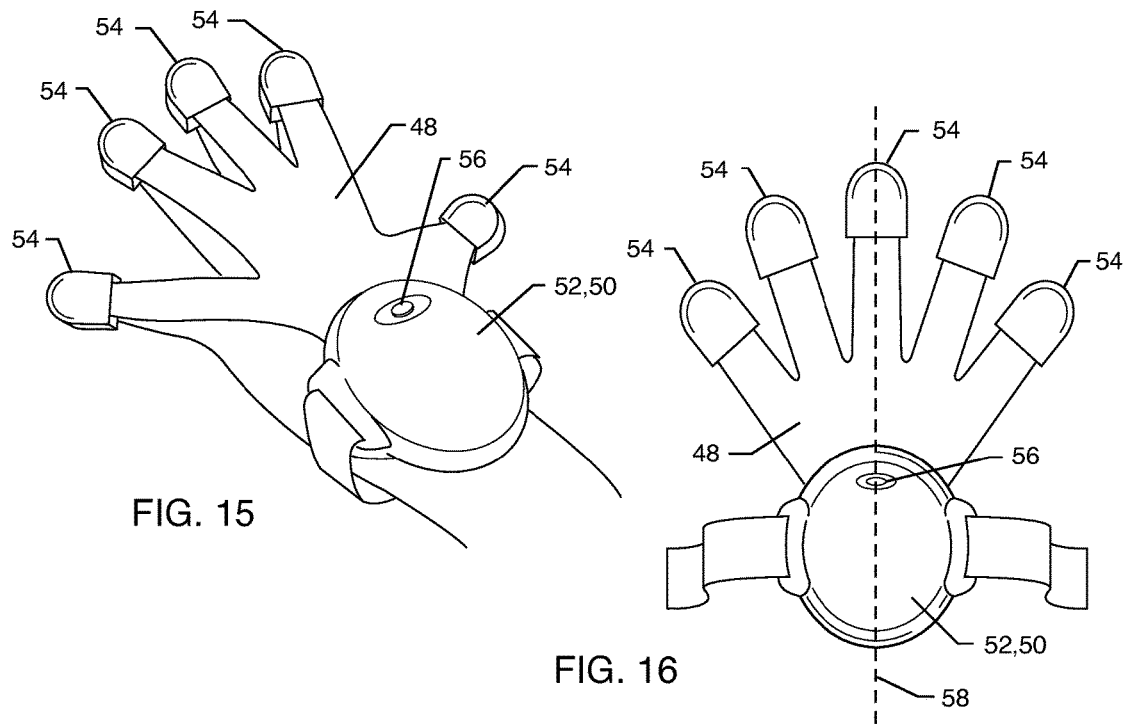
FIG. 15
FIG. 16
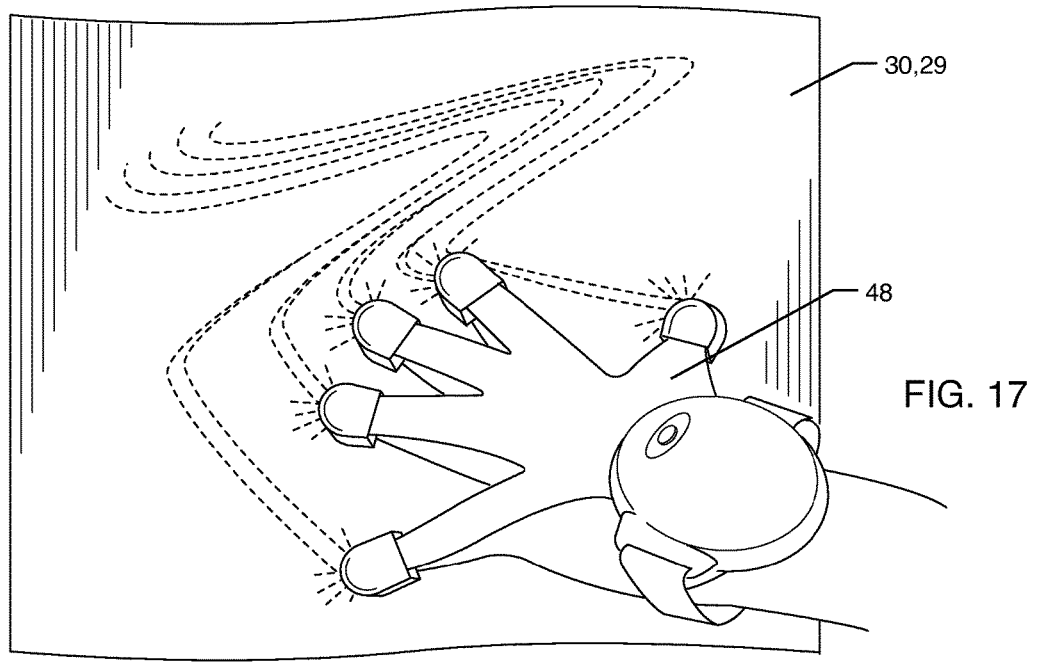
FIG. 17

LIGHT ACTIVATED GLOW-IN-THE-DARK DOODLER

CROSS-REFERENCE TO RELATED APPLICATIONS

This non-provisional patent application claims priority to provisional application 61/549,197 filed on Oct. 19, 2011 the contents of which are fully incorporated herein with this reference.

FIELD OF THE INVENTION

The present invention generally relates to glow-in-the-dark toys. More particularly, the present invention relates to a glow-in-the-dark doodler that is able to project a beam of light a substantial distance away and other inventive aspects.

BACKGROUND OF THE INVENTION

Children have always loved to doodle. Doodling may comprise many forms and use many different tools. For starters, children have been known to use colored crayons to sketch and doodle various scenes. Children doodle with pencils, markers, pens and even with sticks in the dirt. As technology progressed, the tools used by children to sketch have changed as well.

The Etch-A-Sketch® was a mechanical drawing toy invented by French inventor André Cassagnes and subsequently manufactured by the Ohio Art Company. An Etch-A-Sketch® has a thick, flat gray screen in a distinctive red plastic frame. There are two knobs on the front of the frame in the lower corners. Twisting the knobs moves a stylus that displaces aluminum powder on the back of the screen, leaving a solid line. The knobs create lineographic images. The left control moves the stylus horizontally, and the right one moves it vertically. The Etch-A-Sketch® was introduced near the peak of the Baby Boom in 1960, and is one of the best known toys of that generation. It was inducted into the National Toy Hall of Fame at The Strong in Rochester, N.Y. in 1998. In 2003, the Toy Industry Association named Etch-A-Sketch® to its Century of Toys List, a roll call commemorating the 100 most memorable and most creative toys of the 20th century. In spite of its great success, the Etch-A-Sketch® product was not capable of being used in the dark.

The Magna Doodle® was a magnetic drawing toy, consisting of a drawing board, a magnetic stylus, and a few magnet shapes. Invented in 1974, over forty million units have been sold to date worldwide, under several brands, product names and variations. The key element of the toy is the magnetophoretic display panel, filled with a thick, opaque white liquid containing tiny dark magnetic particles. These particles can be drawn to the drawing surface by a magnet-tipped stylus or optionally-provided shapes, or removed to the hidden back side by a sliding eraser bar. The middle layer is divided into a honeycomb of cells, keeping the liquid static and the particles evenly distributed across the panel. The liquid is formulated so that the floating particles can be pulled through it in response to the magnetic forces, but not due to gravity. In spite of its great success, the Magna Doodle® product is not capable of being used in the dark.

The Lite-Brite® was a toy, created by Hasbro in 1967, that allows the user to create glowing designs. It is a light box with small colored plastic pegs that fit into a matrix of holes and illuminate to create a lit piece of art. Using the colored pegs the user can create designs from imagination or by following templates. There are eight peg colors: green, blue, red, yellow, orange, pink, purple and colorless clear. Lite-Brite® allows the artist to create a glowing picture by placing multi-colored translucent plastic pegs through opaque black paper. The light from an illuminated light bulb is blocked by the black paper except where the pegs conduct the light. When lit, the pegs have an appearance similar to that of LEDs. Placing the amount of pegs required to form an image becomes quite cumbersome and time consuming. This limits the creativity of the user when sketching.

The Aquadoodle® was an activity drawing toy primarily for preschool aged children. The patented invention is based on a hydrochromatic ink which causes color change when the user draws with a water filled pen. The user's drawings will remain for several minutes before gradually disappearing. Aquadoodle® is not capable of being used in the dark.

One of the more interesting materials which has intrigued toy manufacturers is that found in materials which are generally described as "luminescent". Luminescent materials are often described as "glow-in-the-dark" materials due to their property of storing illuminating energy received from an external source and thereafter glowing or emitting a subdued light for an extended period of time. Various types of games and toy apparatus attempting to make use of the amusing and interesting properties of luminescent materials have been provided.

Phosphorescence is a specific type of photoluminescence related to fluorescence. Unlike fluorescence, a phosphorescent material does not immediately re-emit the radiation it absorbs. The slower time scales of the re-emission are associated with "forbidden" energy state transitions in quantum mechanics. As these transitions occur very slowly in certain materials, absorbed radiation may be re-emitted at a lower intensity for up to several hours after the original excitation. Commonly seen examples of phosphorescent materials are the glow-in-the-dark toys, paint, and clock dials that glow for some time after being charged with a bright light such as in any normal reading or room light. Typically the glowing then slowly fades out within minutes (or up to a few hours) in a dark room.

Many toys and products have incorporated phosphorescence materials. However, there is always a need for something new when it comes to sketching and doodling. A problem with the prior art is that the UV light has to be held close to the phosphorescent material for the light to be absorbed and then reemitted. Typically, the light emitting device is designed to resemble a pen such that its use mimics that of a traditional pen. Accordingly, the novelty of these products have diminished over time because the use is limited to direct contact and new variations are always sought after in the marketing wars between competing companies.

Accordingly, toy manufacturers are always looking for new and exciting ways to allow children to doodle utilizing new technologies and methods. Therefore, there is a need for a new way to allow children to doodle. The present invention fulfills these needs and provides other related advantages.

SUMMARY OF THE INVENTION

An exemplary embodiment of the present invention includes a glow-in-the-dark toy kit. The kit includes a hand-held light emitting device comprising a power source, a control circuit, a narrow beam light emitting diode and a wide beam light emitting diode. The power source provides an electrical energy to the control circuit. The control circuit provides the electrical energy to either the narrow or wide beam light emitting diodes. The narrow and wide beam light emitting diodes emit a wavelength of light around 405 nanometers a distance of at least 10 feet. The range of the wavelength of light used could also be plus or minus 50 nanometers. A receiving device includes a phosphorescence layer that reemits light once illuminated with the wavelength of light from the emitting device. The hand-held light emitting device can then be used in a dark environment to react with the phosphorescence layer of the receiving device from the distance of at least 10 feet.

In other exemplary embodiments, the receiving device can include a wall cling. The wall cling can be quite large and include at least 5 square feet. Alternatively, the wall cling can be a plurality of wall clings. Furthermore, a plurality of stencils can be used with the wide beam light emitting diode.

The receiving device may be a foldable tent transformable from a fully collapsed configuration to a self supporting expanded configuration. The foldable tent would include an outside blackout layer sufficient to stop light penetration. The phosphorescence layer is disposed on the inside of the foldable tent. Therefore, all outside light is blocked therein creating the dark environment inside the foldable tent.

A light emitting glove may be adapted to be worn on a user's hand. The light emitting glove includes a second power source providing a second electrical energy to a plurality of light emitting diodes disposed at the end of each finger. Furthermore, the light emitting glove may be symmetrically configured to be worn by either a left or a right hand.

An attachable brush may include a plurality of fiber optic strands. The brush may be configured to attach to the hand-held light emitting device.

A portable blackout case may be configured to contain the receiving device inside, wherein the case comprises an outside blackout material sufficient to stop light penetration. The receiving device may include a plurality of different colored canvases each with the phosphorescence layer.

Another exemplary embodiment of the present invention includes a glow-in-the-dark toy kit. The kit includes a hand-held light emitting device having a power source, a control circuit and a light emitting diode. The power source provides an electrical energy to the control circuit. The control circuit provides the electrical energy to the light emitting diode. The light emitting diode emits a wavelength of light around 405 nanometers. A foldable tent transformable from a fully collapsed configuration to a self supporting expanded configuration. The foldable tent includes an outside blackout layer sufficient to stop light penetration and a phosphorescence layer disposed on the inside of the foldable tent.

In other exemplary embodiments, the foldable tent includes a light sealable aperture such that a user can enter and exit the foldable tent. The light sealable aperture may include a zipper, a hook-and-loop type closure or a magnetic closure. A plurality of stencils may also be included in the kit.

The light emitting diode of the hand-held light emitting device emits a distance of at least 10 feet. This allows a user to be able to draw and doodle from a substantial distance away.

A light emitting glove may be adapted to be worn on a user's hand. The light emitting glove includes a second power source providing a second electrical energy to a plurality of light emitting diodes disposed at the end of each finger. Furthermore, the light emitting glove is symmetrically configured to be worn by either a left or a right hand.

Another exemplary embodiment of the present invention includes glow-in-the-dark toy kit. The kit includes a hand-held light emitting device comprising a power source, a control circuit and a light emitting diode. The power source provides an electrical energy to the control circuit. The control circuit provides the electrical energy to the light emitting diode. The light emitting diode emits a wavelength of light around 405 nanometers. A portable case is configured to contain a plurality of canvases inside, wherein each of the plurality of canvases comprises a phosphorescence layer disposed on a substrate. The portable case is comprised of a blackout material sufficient to stop light penetration. The hand-held light emitting device may be tethered to the portable case. The kit may also include a plurality of stencils.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 15 is a perspective view of an exemplary glow glove;

FIG. 16 is a top view of the structure of FIG. 15 showing a symmetrical configuration;

FIG. 17 is a perspective view of the glow glove of FIGS. 15-16 illuminating a phosphorescent surface;

DETAILED DESCRIPTION OF THE PREFERRED EMBODIMENTS

Figure 1:
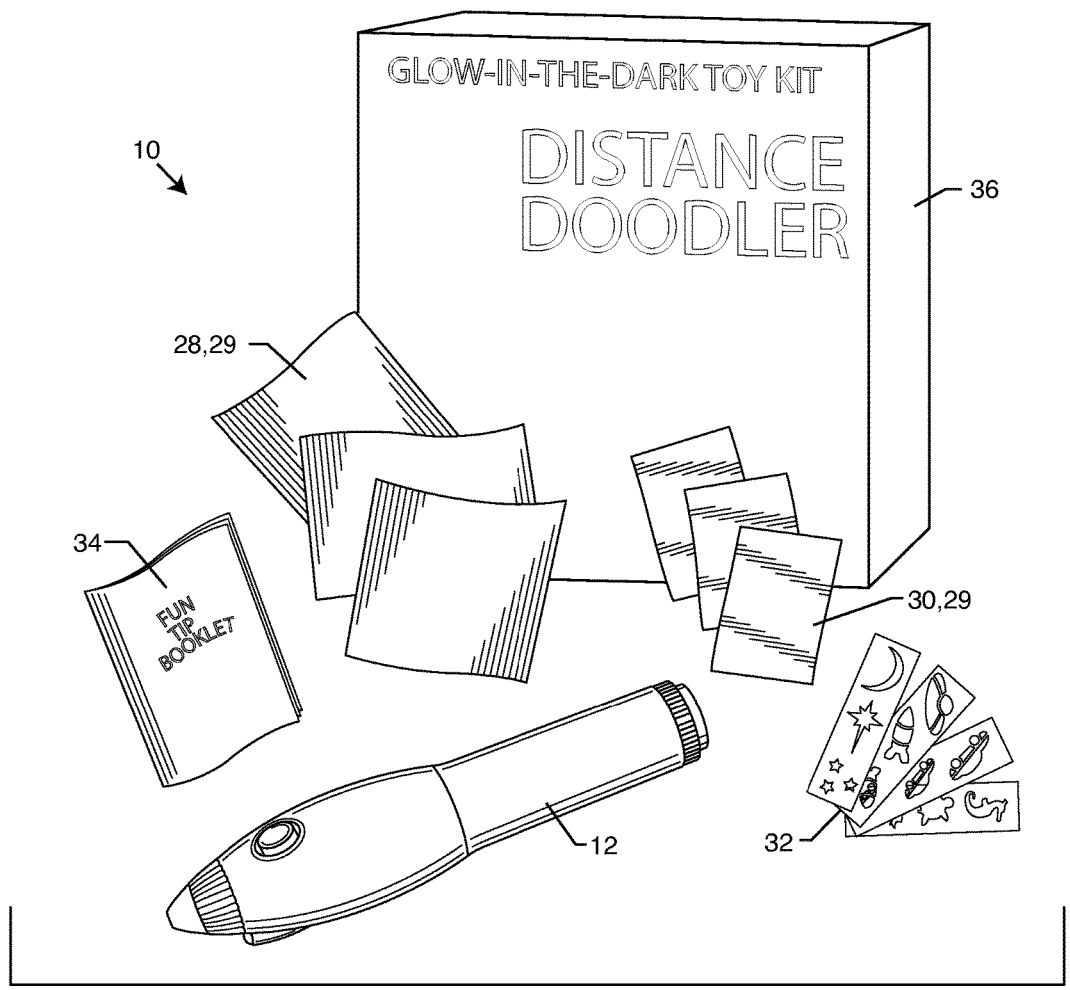
FIG. 1 is a perspective view of an exemplary glow-in-the-dark toy kit embodying the present invention.
Figure 2:
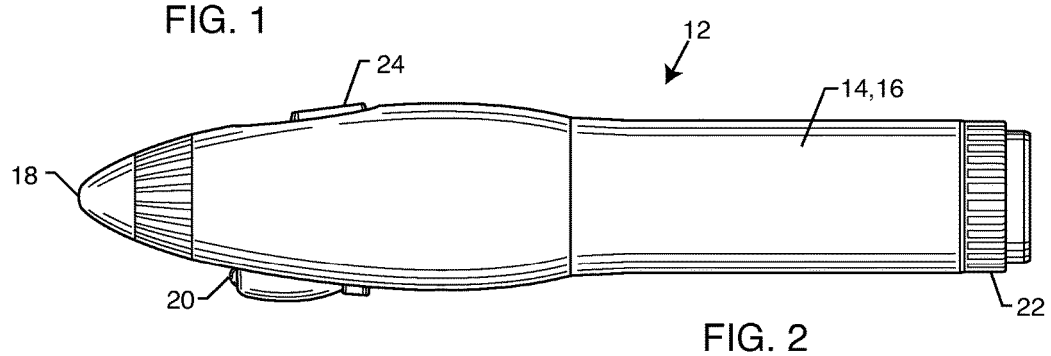
FIG. 2 is a side view of an exemplary distance doodler.

FIG. 1 is a perspective view of an exemplary glow-in-the-dark toy kit 10 embodying the present invention. The kit 10 includes a hand-held light emitting device 12 comprising a power source 14, a control circuit 16, a narrow beam light emitting diode 18 and a wide beam light emitting diode 20. FIG. 2 is a side view of the device 12. The hand-held light emitting device 12 is also referred to herein as a distance doodler 12. The power source 14 and control circuit 16 are contained within the device 12. The power source 14 can be batteries stored within the device 12. The rear 22 of the device 12 can be unscrewed and batteries placed within for electronic power. A button 24 controls the operation of the device 12. A user is then able to manually select whether the device 12 is projecting light out of the narrow beam light emitting diode 18 or the wide beam light emitting diode 20. The device 12 is also sized to easily fit within a user's hand so it is easy to play with and manipulate.

The narrow and wide beam light emitting diodes 18 & 20 emit a wavelength of light around 405 nanometers a distance of at least 10 feet. The range of the wavelength of light used could also be plus or minus 50 nanometers. This is a safe wavelength of light to be used for a toy. Most lasers used are not safe for toys, as the laser beam could injure the eye of the user or another. The device 12 of the present invention has a special electronic board which keeps the power of the laser within the safe Class 1 limits. The device 12 is configured to stay at a constant power even when the power supplied might surge upwards. Therefore, the laser being projected outward is always kept at a safe level.

The kit 10 can also come with a wall cling 28, or a plurality of wall clings 28. The wall clings 28 are designed to stick to a wall. This sticking can be accomplished through static cling or other types of removable adhesives. The wall clings may also be fastened to a wall or ceiling with fasteners.

The wall clings can also be quite large and include more than 5 square feet of area. The wall clings 28 also have a phosphorescent layer 29 that glows-in-the-dark when illuminated.

The chemical used to create the glow-in-the-dark reaction (phosphorescence) is typically a phosphorous based chemical. Phosphorescence is a process in which energy absorbed by a substance is released relatively slowly in the form of light. This is in some cases the mechanism used for "glow-in-the-dark" materials which are "charged" by exposure to light. Unlike the relatively swift reactions in a common fluorescent tube, phosphorescent materials used for these materials absorb the energy and "store" it for a longer time as the processes required to re-emit the light occurs less often.

Phosphorescence is a specific type of photoluminescence related to fluorescence. Unlike fluorescence, a phosphorescent material does not immediately re-emit the radiation it absorbs. The slower time scales of the re-emission are associated with "forbidden" energy state transitions in quantum mechanics. As these transitions occur very slowly in certain materials, absorbed radiation may be re-emitted at a lower intensity for up to several hours after the original excitation.

Common pigments used in phosphorescent materials also include zinc sulfide and strontium aluminate. Use of zinc sulfide for safety related products dates back to the 1930s. However, the development of strontium oxide aluminate, with a luminance approximately 10 times greater than zinc sulfide, has relegated most zinc sulfide based products to the novelty category. Strontium oxide aluminate based pigments are now used in exit signs, pathway marking, and other safety related signage. It is to be understood by one skilled in the art that different types of glow-in-the-dark compositions can be used to practice the invention and therefore this disclosure is not limited to the precise forms described herein.

The kit 10 can also come with smaller wall clings/colored canvases 30 which also have the phosphorescence layer 29. It is up to the preference of the user whether to use the large wall clings 28 or the smaller canvases 30. The kit 10 can also come with stencils 32. The stencils 32 are used to help create unique shapes and designs that may be hard to create free hand. The kit 10 can also come with a fun tip booklet 34. The fun tip booklet 34 can include directions for use and other unique and non-obvious tips and tricks. All of these parts can be packaged into a box 36.

Figure 3:
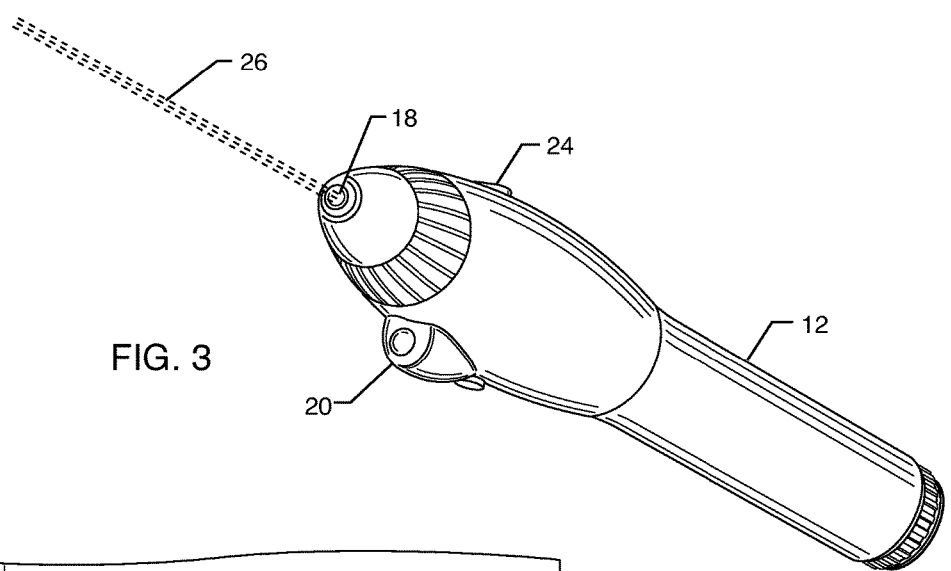
FIG. 3 is a perspective view of the distance doodler of FIG. 2 projecting a narrow beam.
Figure 4:
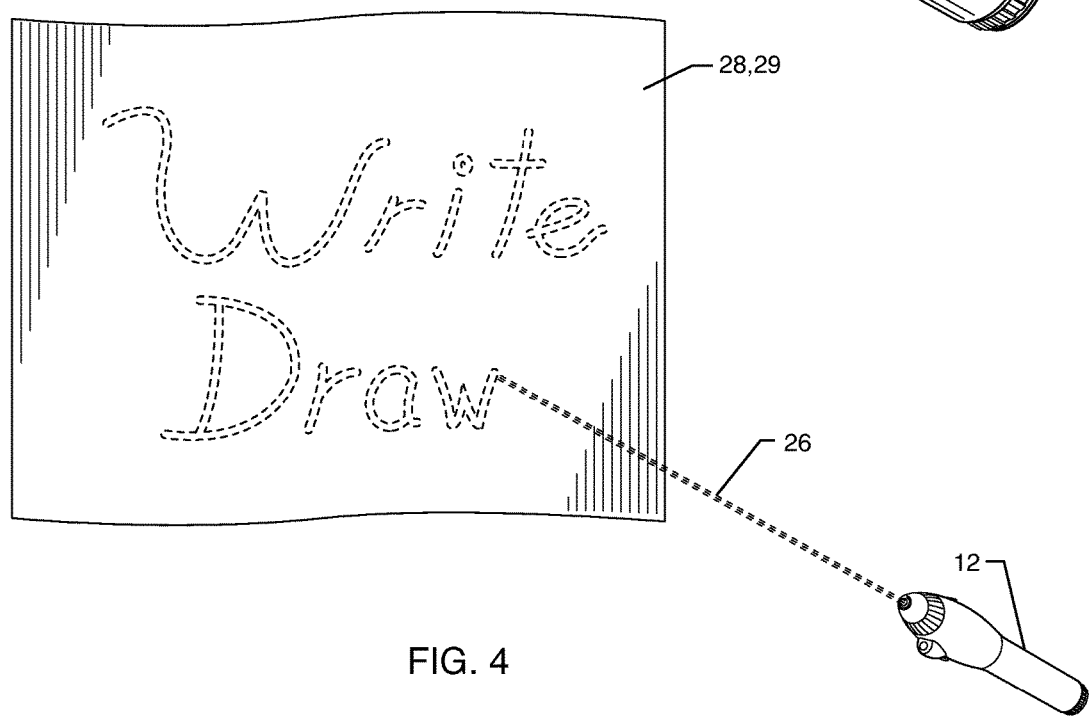
FIG. 4 is the distance doodler of FIG. 3 doodling upon a phosphorescent wall cling.

FIG. 3 is a perspective view of the distance doodler 12 projecting a narrow beam 26 and FIG. 4 is the distance doodler 12 doodling upon a phosphorescent wall cling 28. The narrow beam 26 is able to create fine details such as writing words and text. One main advantage of the present invention is that the device/distance doodler 12 is capable of projecting the narrow laser beam 26 over 10 feet. This then allows a new play pattern to emerge that has not been invented before. The wall cling 28 can be placed upon a ceiling or along a wall where the user is a far distance away from the wall cling 28. Even at this great distance, the user can then use the device 12 to create images upon the wall cling 28. None of the prior art suggested or taught creating a UV projected beam capable of such distance where then distance doodling was possible.

Figure 5:
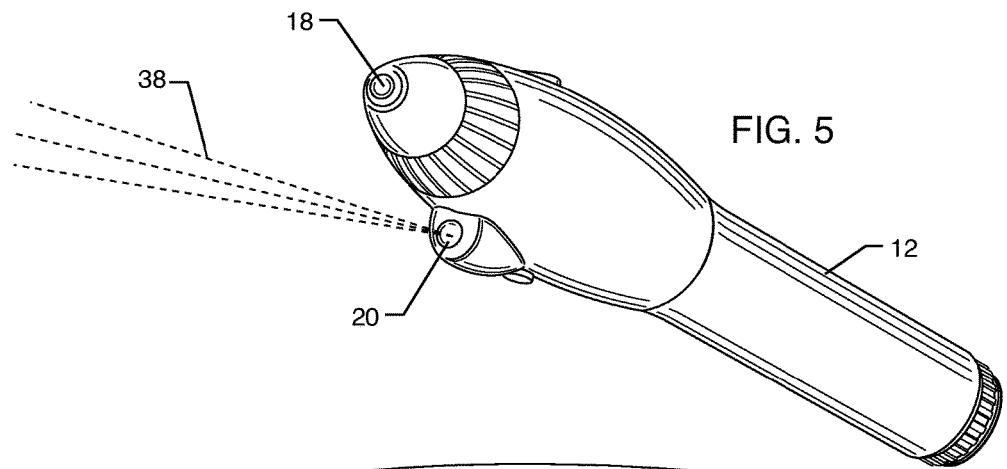
FIG. 5 is a perspective view of the distance doodler of FIG. 2 projecting a wide beam.
Figure 6:
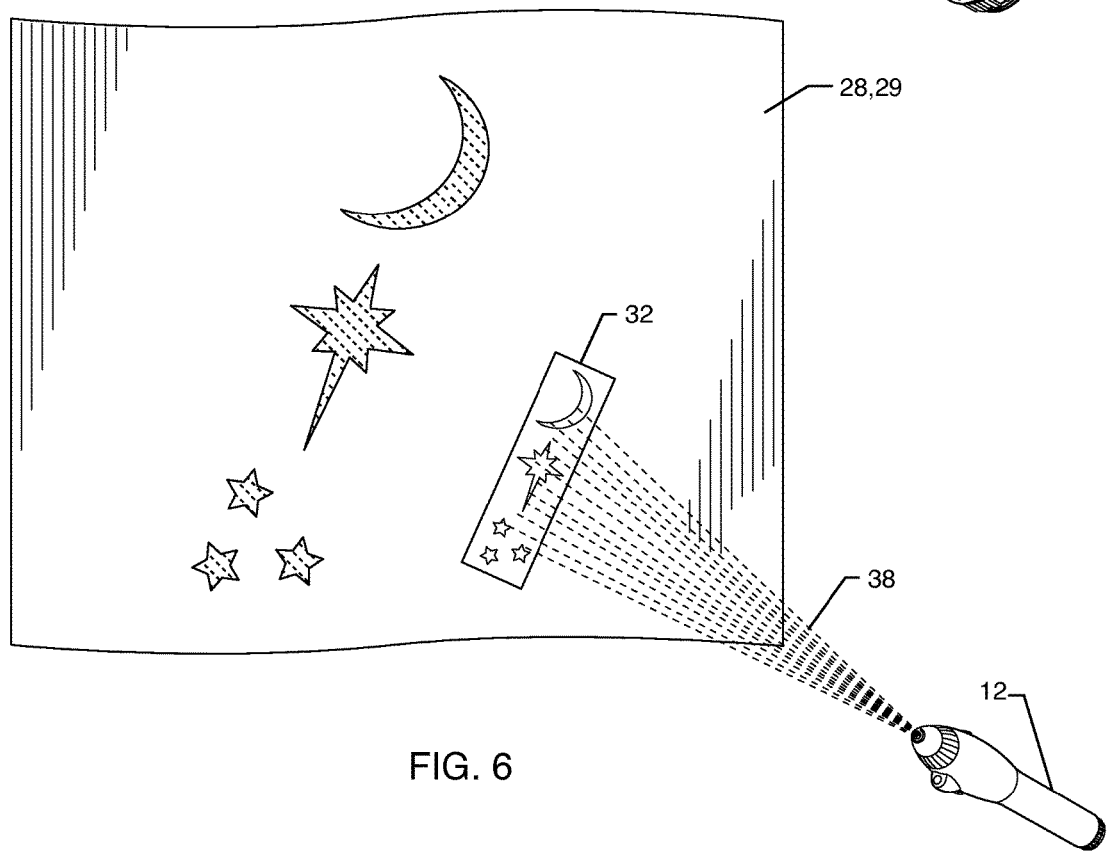
FIG. 6 is a perspective view of the distance doodler of FIG. 5 doodling upon a phosphorescent wall cling utilizing a stencil.
Figure 7:
FIG. 7 is a perspective view of the distance doodler of FIGS. 2-6 now sketching an outline of a person against a phosphorescent wall cling.

FIG. 5 is a perspective view of the distance doodler 12 projecting a wide beam 38 and FIG. 6 shows the doodling upon a phosphorescent wall cling 28 utilizing a stencil 32. As can be seen, the wide beam 38 is better to use to shade objects and for the use of the stencils 32. As shown in FIG. 7, the wide beam 38 can also be used to create the silhouette of a person 40.

Figure 8:
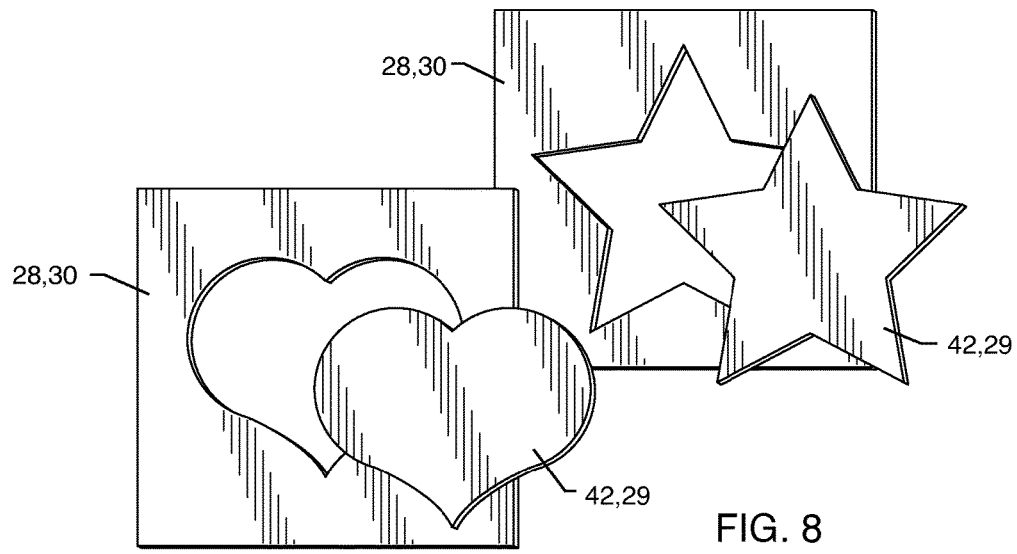
FIG. 8 is a perspective view of a phosphorescence substrate capable of being cut into shapes.
Figure 9:
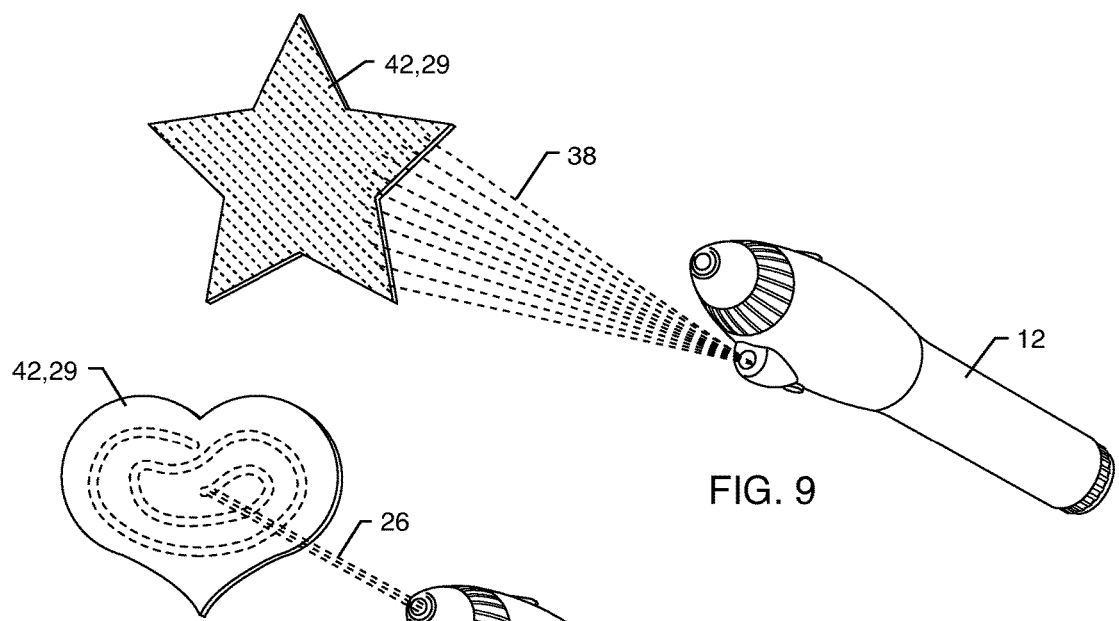
FIG. 9 is a perspective view of the structures of FIG. 8 being illuminated with the wide beam of the distance doodler.
Figure 10:
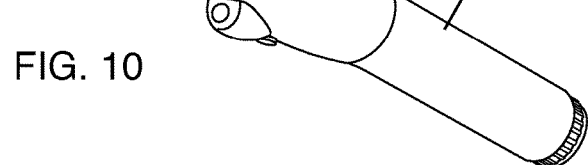
FIG. 10 is a perspective view of the structure of FIG. 8 being illuminated with the narrow beam of the distance doodler.
Figure 11:
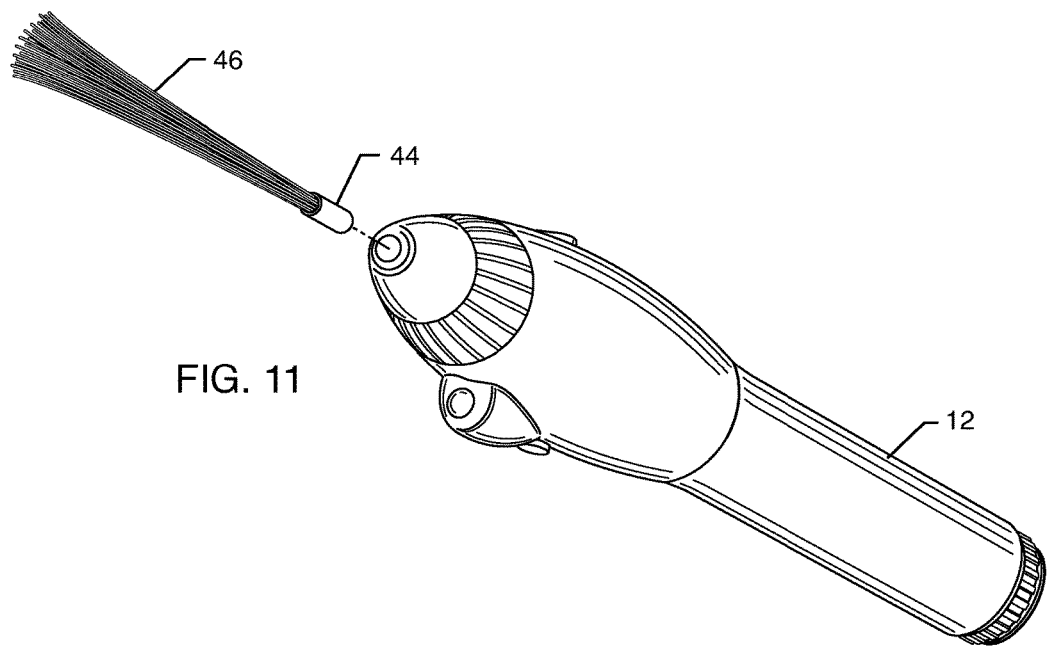
FIG. 11 is a perspective view of an exemplary light brush about to be attached to the distance doodler of FIG. 2.
Figure 12:
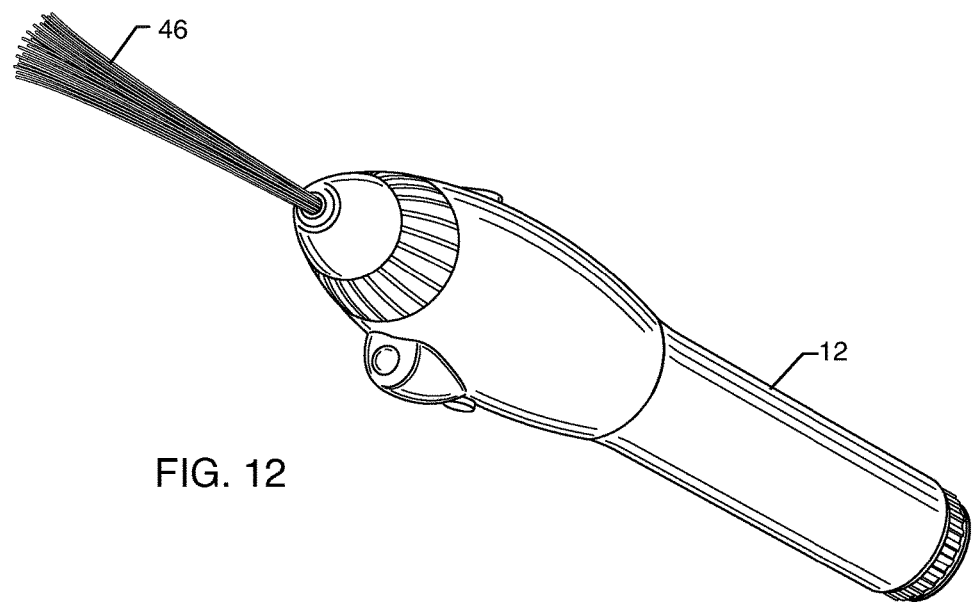
FIG. 12 is a perspective view of the light brush of FIG. 11 now attached to the distance doodler.
Figure 13:
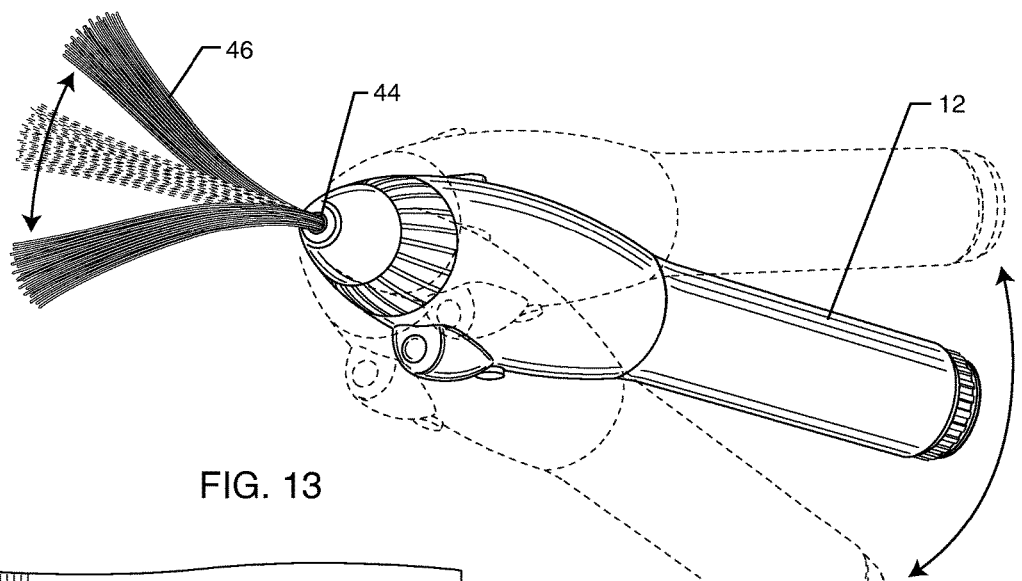
FIG. 13 is a perspective view of the structure of FIG. 12 in use.
Figure 14:
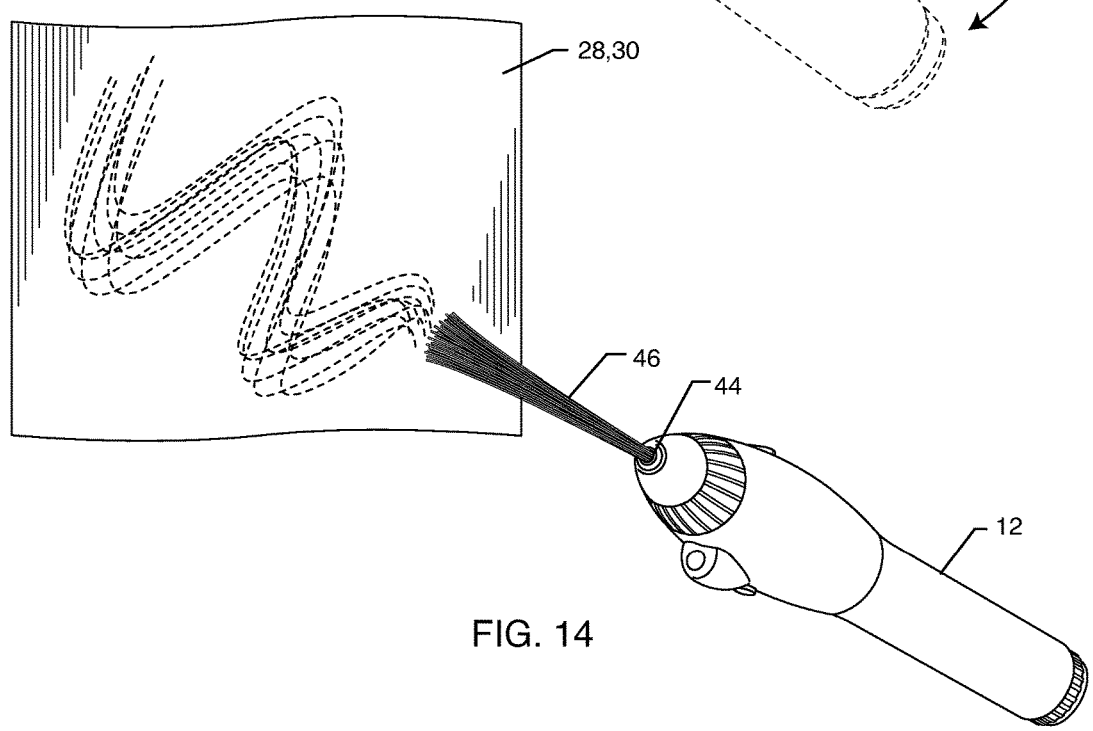
FIG. 14 is a perspective view of the structure of FIG. 12 illuminating a phosphorescent wall cling.

As shown in FIGS. 8-10, the wall clings 28 or canvases 30 may be cut into special shapes 42. These special shapes 42 can then be placed along the walls or ceilings for illumination.

FIGS. 11-14 illustrate a new embodiment where an attachable brush 44 may include a plurality of fiber optic strands 46. The brush 44 may be configured to attach to the hand-held light emitting device 12. Then, when the light emitting diodes (18, 20) are on, the light travels through the brush 44 and along the fiber optic strands 46. The brush 44 may then be used to paint the wall clings 28, canvases 30 or any other suitable phosphorescent layer 29 or surface.

FIGS. 15-17 illustrate another new embodiment of a glow glove 48. The glow glove 48 has a power source 50 and an electronic circuit 52 that controls and provides power to the ends of the fingers where each finger has an individual light emitting diode 54. A button 56 controls operation of the glow glove 48. The user can put on the glow glove 48 and directly contact the phosphorescent surface 29 of the wall cling 28, canvas 30 or any other suitable glow-in-the-dark surface.

The glow glove 48 is symmetrically shaped about the center line 58. This allows the glow glove 48 to be used on any hand, whether it is a left hand or a right hand. This simplifies production of the glow glove 48 as one size fits all.

The glow glove 48 can also include a timing circuit that can turn on and off the lights when in use. Various patterns can then be sketched from choosing between different timing circuits. For instance, the glow glove 48 can turn on and off in a quick manner, such that it appears to be flashing.

Figure 18:
FIG. 18 is a perspective view of an exemplary doodle dome in a closed configuration.
Figure 19:
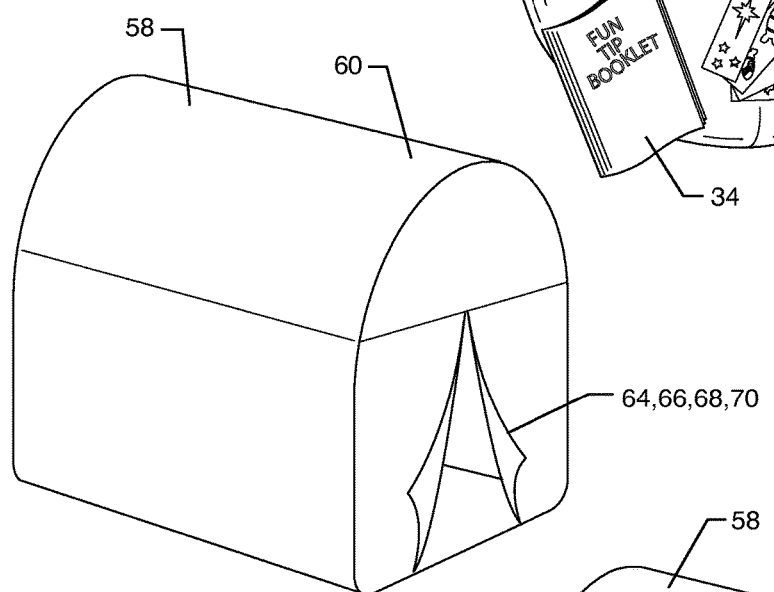
FIG. 19 is a perspective view of the doodle dome of FIG. 18 now in an expanded configuration.
Figure 20:
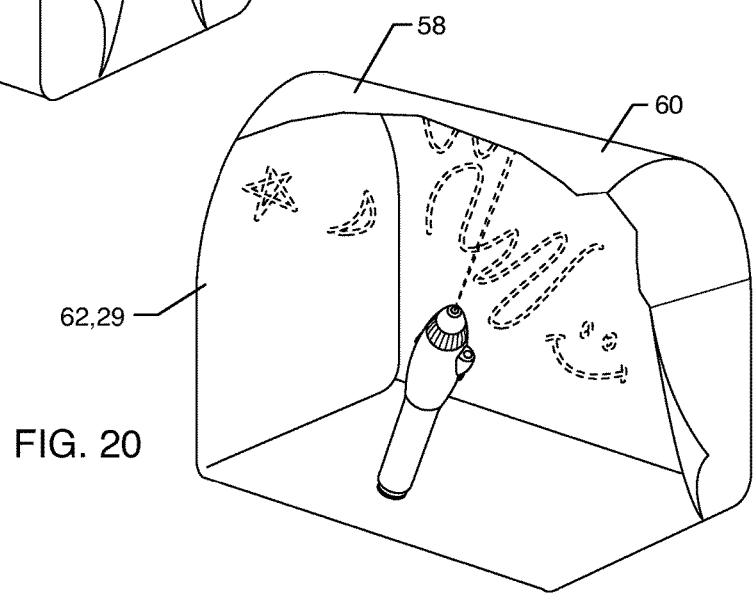
FIG. 20 is a perspective view of the doodle dome of FIG. 19 with its interior phosphorescent surface being illuminated.

FIGS. 18-20 illustrate another new embodiment of a doodle dome 58. The doodle dome 58 is a foldable tent 58 that transforms from a fully collapsed configuration (FIG. 18) to a self supporting expanded configuration (FIG. 19). The foldable tent 58 would include an outside blackout layer 60 sufficient to stop light penetration. The inside phosphorescence layer 62 is disposed on the inside of the foldable tent 58. Therefore, all outside light is blocked therein creating the dark environment inside the foldable tent 58.

The foldable tent 58 includes a light sealable aperture 64 such that a user can enter and exit the foldable tent. The light sealable aperture 64 may include a zipper 66, a hook-and-loop type closure 68 or a magnetic closure 70. A plurality of stencils 32 may also be included in the kit. The foldable tent 58 may also be stored in a carrying bag 72 with a handle 74.

Figure 21:
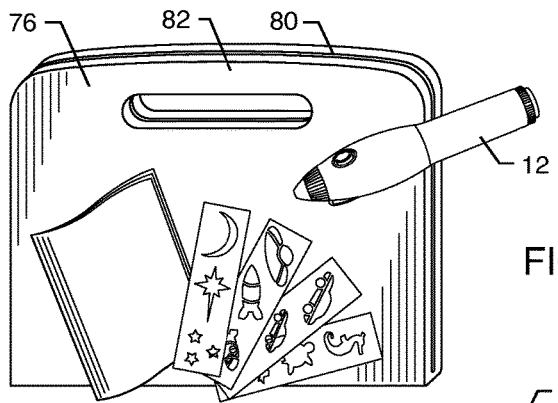
FIG. 21 is a perspective view of an exemplary blackout carrying case.
Figure 22:
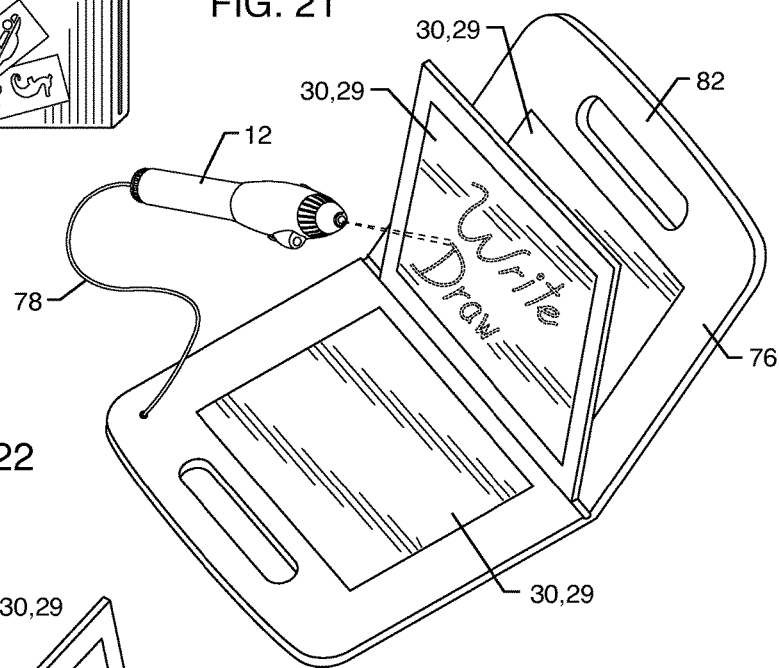
FIG. 22 is a perspective view of the carrying case of FIG. 21 now open with a plurality of phosphorescent canvases.
Figure 23:
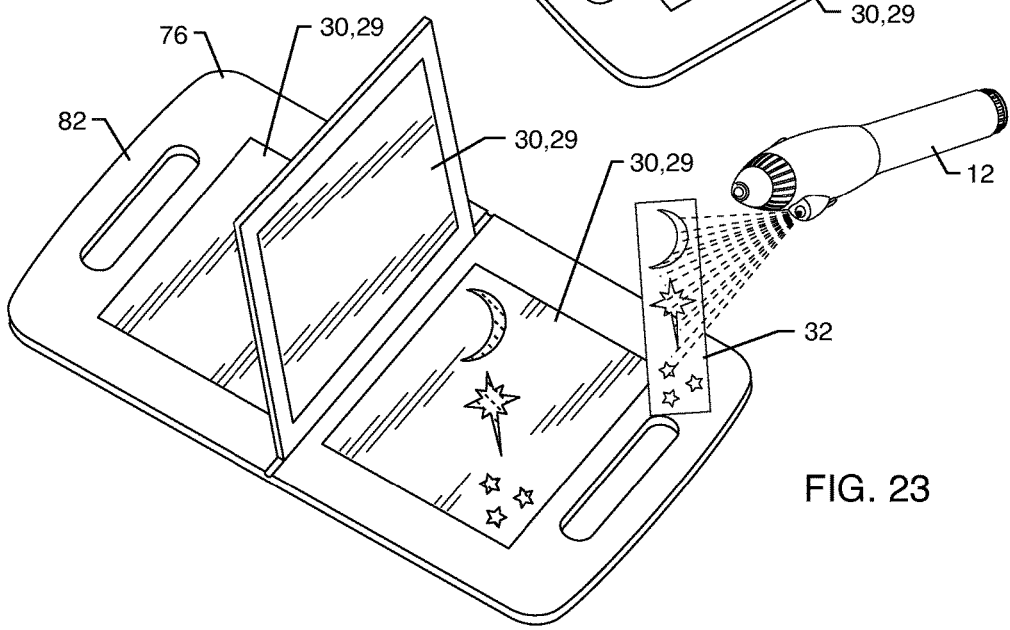
FIG. 23 is another perspective view of the carrying case of FIG. 21 now showing a stencil in use.

FIGS. 21-23 illustrate another new embodiment of a portable case 76. The portable case 76 is configured to contain a plurality of canvases 30 inside, wherein each of the plurality of canvases 30 comprises a phosphorescence layer 29 disposed on a substrate. The portable case 76 is comprised of a blackout material sufficient to stop light penetration. The hand-held light emitting device 12 may be tethered 78 to the portable case 76. The tether helps to keep the device 12 from being lost, which is especially important because the product is used in dark conditions. The portable case 76 can also include a zipper closure 80 and a handle 82.

As can be seen by one skilled in the art, a receiving device includes a phosphorescence layer 29 that reemits light once illuminated with the wavelength of light from the emitting device 12. The receiving device can include a wall cling 28, a canvas 30, a foldable tent 58 or a portable case 76. The hand-held light emitting device 12 can then be used in a dark environment to react with the phosphorescence layer 29 of the receiving device.

Although several embodiments have been described in detail for purposes of illustration, various modifications may be made to each without departing from the scope and spirit of the invention. Accordingly, the invention is not to be limited, except as by the appended claims.

What is claimed is:

1. A glow-in-the-dark toy kit, comprising:
   a hand-held light emitting device comprising a power source, a control circuit, a narrow beam light emitting diode next to a wide beam light emitting diode, wherein the power source provides an electrical energy to the control circuit, wherein the control circuit provides the electrical energy to either the narrow or wide beam light emitting diodes, wherein the narrow and wide beam light emitting diodes emit a wavelength of light 405 nanometers plus or minus 50 nanometers a distance of at least 10 feet;
   a receiving device comprising a phosphorescence layer, wherein the hand-held light emitting device can be used in a dark environment to react with the phosphorescence layer of the receiving device from the distance of at least 10 feet; and
   a portable blackout case configured to contain the receiving device inside, wherein the case comprises an outside blackout material sufficient to stop light penetration.

2. The kit of claim 1, wherein the receiving device comprises a wall cling.

3. The kit of claim 2, wherein the wall cling comprises at least 5 square feet.

4. The kit of claim 2, wherein the wall cling comprises a plurality of wall clings.

5. The kit of claim 2, including a plurality of stencils to be used with the wide beam light emitting diode.

6. The kit of claim 1, wherein the receiving device comprises a foldable tent transformable from a fully collapsed configuration to a self supporting expanded configuration, the foldable tent comprising an outside blackout layer sufficient to stop light penetration, wherein the phosphorescence layer is disposed on the inside of the foldable tent, such that all outside light is blocked creating the dark environment inside the foldable tent.

7. The kit of claim 1, including a light emitting glove adapted to be worn on a user's hand, the light emitting glove comprising a second power source providing a second electrical energy to a plurality of light emitting diodes disposed at the end of each finger.

8. The kit of claim 7, wherein the light emitting glove is symmetrically configured to be worn by either a left or a right hand.

9. The kit of claim 1, including an attachable brush comprising a plurality of fiber optic strands, the brush configured to attach to the hand-held light emitting device.

10. The kit of claim 1, wherein the receiving device comprises a plurality of different colored canvases each with the phosphorescence layer.

11. A glow-in-the-dark toy kit, comprising:
    a hand-held light emitting device comprising a power source, a control circuit and a light emitting diode, wherein the power source provides an electrical energy to the control circuit, wherein the control circuit provides the electrical energy to the light emitting diode, wherein the light emitting diode emits a wavelength of light 405 nanometers plus or minus 50 nanometers;
    a foldable tent transformable from a fully collapsed configuration to a self supporting expanded configuration, the foldable tent comprising an outside blackout layer sufficient to stop light penetration and a phosphorescence layer disposed on the inside of the foldable tent; and
    a light emitting glove adapted to be worn on a user's hand, the light emitting glove comprising a second power source providing a second electrical energy to a plurality of light emitting diodes disposed at the end of each finger, wherein the light emitting glove is symmetrically configured to be worn by either a left or a right hand.

12. The kit of claim 11, wherein the foldable tent comprises a light sealable aperture such that a user can enter and exit the foldable tent.

13. The kit of claim 11, wherein the light sealable aperture comprises a zipper, a hook-and-loop type closure or a magnetic closure.

14. The kit of claim 11, including a plurality of stencils.

15. The kit of claim 11, wherein the light emitting diode of the hand-held light emitting device emits a distance of at least 10 feet.

16. A glow-in-the-dark toy kit, comprising:
a hand-held light emitting device comprising a power source, a control circuit and a light emitting diode, wherein the power source provides an electrical energy to the control circuit, wherein the control circuit provides the electrical energy to the light emitting diode, wherein the light emitting diode emits a wavelength of light 405 nanometers plus or minus 50 nanometers; and
a portable case configured to house a plurality of canvases inside, wherein each of the plurality of canvases comprises a phosphorescence layer disposed on a substrate, and wherein the portable case is comprised of a black-out material sufficient to stop light penetration.

17. The kit of claim 16, wherein the hand-held light emitting device is tethered to the portable case.

18. The kit of claim 16, including a plurality of stencils.

* * * * *